（12） United States Patent
Yisraelian et al.

(10) Patent No.: US 8,702,007 B2
(45) Date of Patent: Apr. 22, 2014

(54) ON CARD DISPLAY OF DATA FROM SECURED CHIP (75) Inventors: Shimon Yisraelian, Nes Ziona (IL); Ronen Shaul, Kiriat Bialik (IL); Ronen Lin, Ramat Gan (IL); Gad Terliuc, Ra'anana (IL)

(73) Assignee: Powered Card Solutions, LLC, Lakeland, FL (US)

( * ) Notice: Subject to any disclaimer, the term of this patent is extended or adjusted under 35 U.S.C. 154(b) by 0 days.

(21) Appl. No.: 13/142,994

(22) PCT Filed: Jan. 7, 2010

(86) PCT No.: PCT/IL2010/000014
§ 371 (c)(1),
(2), (4) Date: Sep. 26, 2011

(87) PCT Pub. No.: WO2010/079483
PCT Pub. Date: Jul. 15, 2010

(65) Prior Publication Data
US 2012/0024961 A1 Feb. 2, 2012

Related U.S. Application Data (60) Provisional application No. 61/193,908, filed on Jan. 7, 2009, provisional application No. 61/202,182, filed on Feb. 4, 2009.

(51) Int. Cl.
*G06K 19/06* (2006.01)
*G06K 19/07* (2006.01)
*G06K 19/077* (2006.01)
*G06Q 20/34* (2012.01)

(52) U.S. Cl.
CPC ...... *G06K 19/0723* (2013.01); *G06K 19/07703* (2013.01); *G06K 19/07701* (2013.01); *G06Q 20/341* (2013.01)
USPC .......................................................... 235/492

(58) Field of Classification Search
USPC .......................................................... 235/492
See application file for complete search history.

(56) References Cited

U.S. PATENT DOCUMENTS 4,667,087 A 5/1987 Quintana
5,478,994 A 12/1995 Rahman et al.
(Continued)

FOREIGN PATENT DOCUMENTS

EP 0793205 A2 9/1997
JP 2008530702 A 8/2008
(Continued)

OTHER PUBLICATIONS

Agam Shah "Visa Toys With Credit Card Displays" PC World Publication [online], Apr. 29, 2004. Retrieved from the Internet. URL>http://www.pcworld.com/article/115910/visa_toys_with_credit_card_displays.html.

(Continued)

*Primary Examiner* — Christopher Stanford
(74) *Attorney, Agent, or Firm* — Morris, Manning & Martin, LLP; Christopher W. Raimund (57) ABSTRACT

A retrofitted credit card including a certified smart card chip, a display and retrofitted emulation circuitry operative to enable the certified smart card chip to communicate information to the display notwithstanding that the certified smart card chip is configured for communication only with an external read/write device.

19 Claims, 6 Drawing Sheets

(56) References Cited

U.S. PATENT DOCUMENTS

| | | | |
|---|---|---|---|
| 5,485,520 A | | 1/1996 | Chaum et al. |
| 5,585,787 A | * | 12/1996 | Wallerstein ............... 340/5.42 |
| 5,590,038 A | | 12/1996 | Pitroda |
| 5,838,059 A | * | 11/1998 | Inoue et al. ............... 257/679 |
| 5,945,652 A | * | 8/1999 | Ohki et al. ............... 235/380 |
| 6,202,927 B1 | | 3/2001 | Bashan et al. |
| 6,247,129 B1 | | 6/2001 | Keathley et al. |
| 6,595,342 B1 | | 7/2003 | Maritzen et al. |
| 6,641,050 B2 | | 11/2003 | Kelley et al. |
| 6,769,607 B1 | | 8/2004 | Pitroda et al. |
| 6,863,219 B1 | | 3/2005 | Jacobsen et al. |
| 7,128,274 B2 | | 10/2006 | Kelley et al. |
| 7,530,495 B2 | | 5/2009 | Cooper |
| 2003/0011868 A1 | | 1/2003 | Zehner et al. |
| 2003/0052168 A1 | | 3/2003 | Wong |
| 2003/0085286 A1 | * | 5/2003 | Kelley et al. ............... 235/492 |
| 2005/0231490 A1 | | 10/2005 | Golan et al. |
| 2006/0242698 A1 | | 10/2006 | Inskeep et al. |
| 2006/0282330 A1 | | 12/2006 | Frank et al. |
| 2006/0287964 A1 | | 12/2006 | Brown |
| 2007/0235539 A1 | | 10/2007 | Sevanto et al. |
| 2007/0241183 A1 | | 10/2007 | Brown et al. |
| 2008/0011833 A1 | | 1/2008 | Saarisalo |
| 2008/0149734 A1 | * | 6/2008 | Musial et al. ............... 235/492 |
| 2008/0223937 A1 | | 9/2008 | Preta et al. |
| 2009/0255996 A1 | | 10/2009 | Brown et al. |

FOREIGN PATENT DOCUMENTS

| | | |
|---|---|---|
| WO | 0247022 A1 | 6/2002 |
| WO | 2006087673 A1 | 8/2006 |
| WO | 2010079483 A1 | 7/2010 |

OTHER PUBLICATIONS

International Search Report dated May 13, 2010.
Publication "Anti-fraud credit card features E-Ink display" available on the Internet at the URL http://www.gizmag.com/emue-credit-card-visa-fraud/13374/picture/105352/. (Dec. 2012).
"E-Transactions on the move", Video taken at CarteS 2007 in Paris, showing Display Card technology by NXP Semiconductors. (Video Uploaded on Dec. 11, 2007). http://www.youtube.com/watch?v=SNNdEpPN3ro.
EP Search Report dated Dec. 7, 2012.

* cited by examiner

ON CARD DISPLAY OF DATA FROM SECURED CHIP

REFERENCE TO RELATED APPLICATIONS

Reference is hereby made to U.S. Provisional Patent Application Ser. No. 61/193,908, filed Jan. 7, 2009 and entitled ON-CARD INTERFACE & METHOD FOR ACTIVATION OF A SECURED DUAL-INTERFACE SMART CARD MICROCONTROLLER, and to U.S. Provisional Patent Application Ser. No. 61/202,182, filed Feb. 4, 2009 and entitled ON-CARD INTERFACE FOR A SECURED DUAL-INTERFACE SMART CARD MICROCONTROLLER WITH A SINGLE INPUT/OUTPUT PIN, the disclosures of which are hereby incorporated by reference and priority of which are hereby claimed pursuant to 37 CFR 1.78(a)(4) and (5)(i).

FIELD OF THE INVENTION

The present invention relates to smart cards generally and more particularly to smart cards based on secure smart card chips.

BACKGROUND OF THE INVENTION

The following publications are believed to represent the current state of the art:

U.S. Pat. Nos. 4,667,087; 5,478,994; 5,485,520; 5,590,038; 6,202,927; 6,247,129; 6,595,342; 6,641,050; 6,769,607; 7,128,274 and 7,530,495.

U.S. PUBLISHED PATENT APPLICATIONS: 2005/0231490; 2006/0242698; 2007/0235539; 2007/0241183; 2008/0011833 and 2009/0255996;

NXP publication "e-Transactions on the move" available on the Internet at the URL http://www.nxp.com/infocus/campaigns/cartes/index.html PCWorld publication "Visa Toys with Credit Card Displays" available on the Internet at the URL http://www.pcworld.com/article/115910/visa_toys_with_credit_card_displays.html Publication "Anti-fraud credit card features E-Ink display" available on the Internet at the URL http://www.gizmag.com/emue-credit-card-visa-fraud/13374/picture/105352/

SUMMARY OF THE INVENTION

The present invention seeks to provide an improved smart card based on a secure smart card chip.

There is thus provided in accordance with a preferred embodiment of the present invention a retrofitted credit card including a certified smart card chip, a display and retrofitted emulation circuitry operative to enable the certified smart card chip to communicate information to the display notwithstanding that the certified smart card chip is configured for communication only with an external read/write device.

There is also provided in accordance with another preferred embodiment of the present invention a retrofitted debit card including a certified smart card chip, a display and retrofitted emulation circuitry operative to enable the certified smart card chip to communicate information to the display notwithstanding that the certified smart card chip is configured for communication only with an external read/write device.

There is further provided in accordance with yet another preferred embodiment of the present invention a retrofitted smart card including a certified smart card chip, a display and retrofitted emulation circuitry operative to enable the certified smart card chip to communicate information to the display notwithstanding that the certified smart card chip is configured for communication only with an external read/write device.

There is yet further provided in accordance with still another preferred embodiment of the present invention a retrofitted smart card including a certified smart card chip including secure access circuitry permitting communication exclusively with a certified smart card chip reader, a display and retrofitted circuitry operative to enable the certified smart card chip to communicate data to the display and also to communicate with the certified smart card chip reader.

Preferably, the retrofitted card also includes a generally credit-card sized substrate supporting the certified smart card chip, the display and the retrofitted circuitry. Additionally or alternatively, the retrofitted card also includes an electrical power element operative for powering the certified smart card chip, the retrofitted circuitry and the display. Alternatively or additionally, the retrofitted card also includes power management circuitry operative to provide electrical power to the certified smart card chip and to the display generally at non-overlapping times.

In accordance with a preferred embodiment of the present invention the substrate has a thickness which does not exceed 0.8 mm.

In accordance with a preferred embodiment of the present invention the retrofitted card also includes retrofit firmware for operating the certified smart card chip at least in the absence of an external read/write device.

Preferably, the retrofitted circuitry includes hardware external to the certified smart card chip. Additionally or alternatively, the certified smart card chip is a smart card chip which is operable to communicate data only with an external read/write device and with the display.

In accordance with a preferred embodiment of the present invention the retrofitted card also includes at least one of a contact interface and a contactless interface mounted on the substrate. Additionally or alternatively, the certified smart card chip is employed in a retrofitted context to operate in a manner other than its intended manner of use.

Preferably, the retrofitted card also includes a bus which interconnects the certified smart card chip with the contact interface. Alternatively, the retrofitted card also includes a bidirectional connection which interconnects the certified smart card chip with the contactless interface.

In accordance with a preferred embodiment of the present invention the retrofitted card also includes a manually operable display control switch. Preferably, the retrofitted circuitry includes control logic circuitry which receives electrical power from power management circuitry. Additionally, the power management circuitry includes a switch actuation sensor which is coupled to the display control switch.

Preferably, the switch actuation sensor provides a switch actuation output to first and second relay control circuits. Additionally, the first relay control circuit is operative in response to the switch actuation output to provide electrical power to the certified smart card chip.

In accordance with a preferred embodiment of the present invention the second relay control circuit is operative in response to the switch actuation output to provide electrical power to the control logic circuitry, to a display driver and to an interval timer.

Preferably, the retrofitted card also includes real time clock circuitry providing real time security code generation.

There is also provided in accordance with another preferred embodiment of the present invention a method of providing a credit card with a card-mounted display function including providing a certified smart card chip, associating a display with the certified smart card chip and emulating an external read/write device to enable the certified smart card chip to communicate with the display notwithstanding that the certified smart card chip had originally been configured for secure communication only with an external read/write device.

There is further provided in accordance with yet another preferred embodiment of the present invention a method of providing a debit card with a card-mounted display function including providing a certified smart card chip, associating a display with the certified smart card chip and emulating an external read/write device to enable the certified smart card chip to communicate with the display notwithstanding that the certified smart card chip had originally been configured for secure communication only with an external read/write device.

There is even further provided in accordance with still another preferred embodiment of the present invention a method of providing a smart card with a card-mounted display function including providing a certified smart card chip, associating a display with the certified smart card chip and emulating an external read/write device to enable the certified smart card chip to communicate with the display notwithstanding that the certified smart card chip had originally been configured for secure communication only with an external read/write device.

There is still further provided in accordance with yet another preferred embodiment of the present invention a method for providing a smart card with a card-mounted display function including providing a certified smart card chip including secure access circuitry permitting communication exclusively with a certified smart card chip reader, associating a display with the certified smart card chip and causing the certified smart card chip to communicate data to the display and also to communicate with the certified smart card chip reader.

Preferably, the method also includes running retrofit firmware residing on the certified smart card chip for operating the certified smart card chip at least in the absence of an external read/write device. Additionally or alternatively, the method also includes providing a switch actuation signal when a user actuates a display control switch and responsive to the switch actuation signal, supplying a voltage to the certified smart card chip and simultaneously actuating a clock oscillator which begins to provide a clock signal to a clock terminal of the certified smart card chip.

In accordance with a preferred embodiment of the present invention, the method also includes supplying a voltage to the certified smart card chip enabling the certified smart card chip to run retrofit firmware installed thereon including mode of operation identification functionality, which enables the certified smart card chip to distinguish between operation in communication with a conventional contact or contactless smart card reader and stand-alone operation. Additionally, the method also includes the stand-alone mode of operation employing at least some of the same data terminals which are used for non-stand-alone operation.

Preferably, the method also includes the mode of operation identification functionality sensing whether the serial data terminal of the certified smart card chip is in a positive or zero logic state, wherein a positive logic state indicates that a conventional contact smart card reader is galvanically connected to the certified smart card chip and zero logic state indicates that the certified smart card chip is connected for operation in a stand-alone mode.

In accordance with a preferred embodiment of the present invention, the method also includes that when the certified smart card chip operates in a stand-alone mode of operation, at least one of the following steps occurs:

I. retrofit firmware controls communications to and from the certified smart card chip;
 II. the retrofit firmware employs the clock signals received from a clock oscillator;
 III. the retrofit firmware operates the certified smart card chip for processing and displaying secure data on the display;
 IV. the retrofit firmware configures a display driver to display the secure data;
 IV. the retrofit firmware sets a predetermined time duration on an interval timer;
 V. the retrofit firmware issues a single instruction which results in the sequence indicated below:
  the supply of electrical power to the certified smart card chip is terminated, thus disabling the retrofit firmware; and
  once the supply of electrical power to the certified smart card chip has been terminated and the retrofit firmware has been disabled, the display driver causes the display to display the secure data for a predetermined time duration; and
  at the end of the predetermined time duration, the supply of electrical power to the display is terminated.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
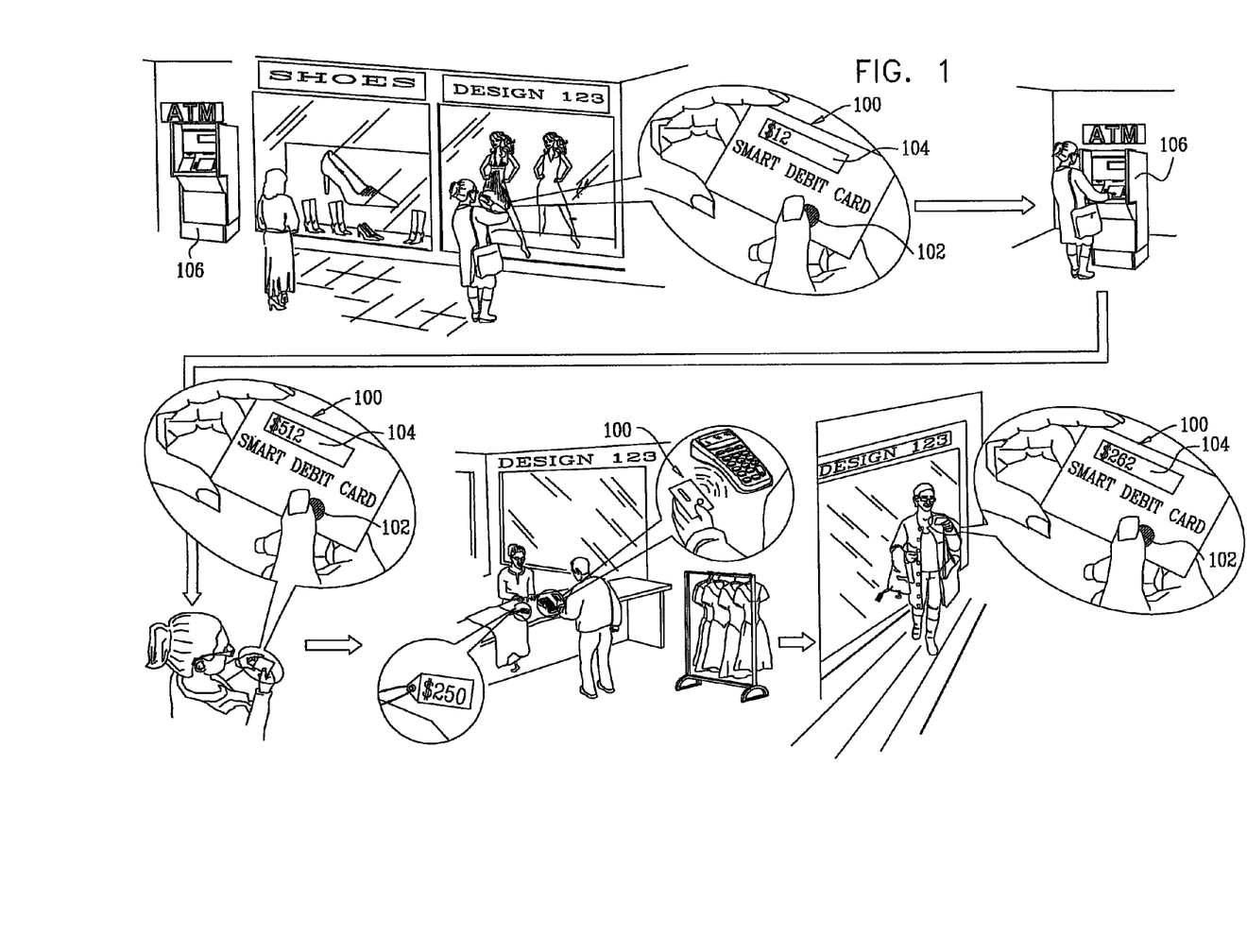
FIG. 1 is a simplified pictorial illustration of a scenario demonstrating typical use of a debit card, constructed and operative in accordance with a preferred embodiment of the present invention.

Reference is now made to FIG. 1, which is a simplified pictorial illustration of a scenario demonstrating typical use of a smart debit card, constructed and operative in accordance with a preferred embodiment of the present invention. The term "smart debit card" as used throughout refers to a debit card including a certified smart card chip and is retrofitted for stand-alone operation.

The term "certified smart card chip" is defined as a smart card chip which is ordinarily operable to communicate data only with an external read/write device.

Preferred examples of certified smart card chips are chips which comply with one or both of the following certification standards: ISO/IEC 7816 and ISO/IEC 14443. Such chips preferably comply with additional standards, such as Common Criteria EAL4+/EAL5+ (ISO/IEC15408 Information technology—Security techniques—Evaluation criteria for IT security parts 1-3), FIPS 140-2 level 3 and 4, ISO/IEC 7816 Identification cards—Integrated circuit cards parts 1-5, ISO/IEC14443 Identification cards—Contactless integrated circuit cards—Proximity cards parts 1-4, and EMVCo.

As seen in FIG. 1, a consumer, considering a possible purchase, queries the amount remaining on her smart debit card 100 typically by pushing a button 102, thereby activating a display 104 which displays her debit card balance. It is a particular feature of the present invention, that by virtue of the stand-alone operation of the smart debit card, the consumer may obtain an indication of the debit card balance at any location and not only at a point of sale terminal or ATM. It is appreciated that the display may be activated by any other suitable activation activity, such as a user-secure biometric interaction with the user or the entry of a pin code.

The consumer, noting that the debit card balance is insufficient for the contemplated purchase, goes to an ATM 106 to add value to the smart debit card. It is appreciated that the function of adding or subtracting value from the smart debit card is highly secured in accordance with one or more certification standards commonly used in the banking industry, such as those referenced above and is not accessible to the holder of the smart debit card.

The consumer confirms the updated debit card balance by stand-alone operation of the smart debit card and then proceeds to make a purchase. Following the purchase, the consumer confirms the updated debit card balance by using the smart debit card in a stand-alone mode of operation.

Figure 2:
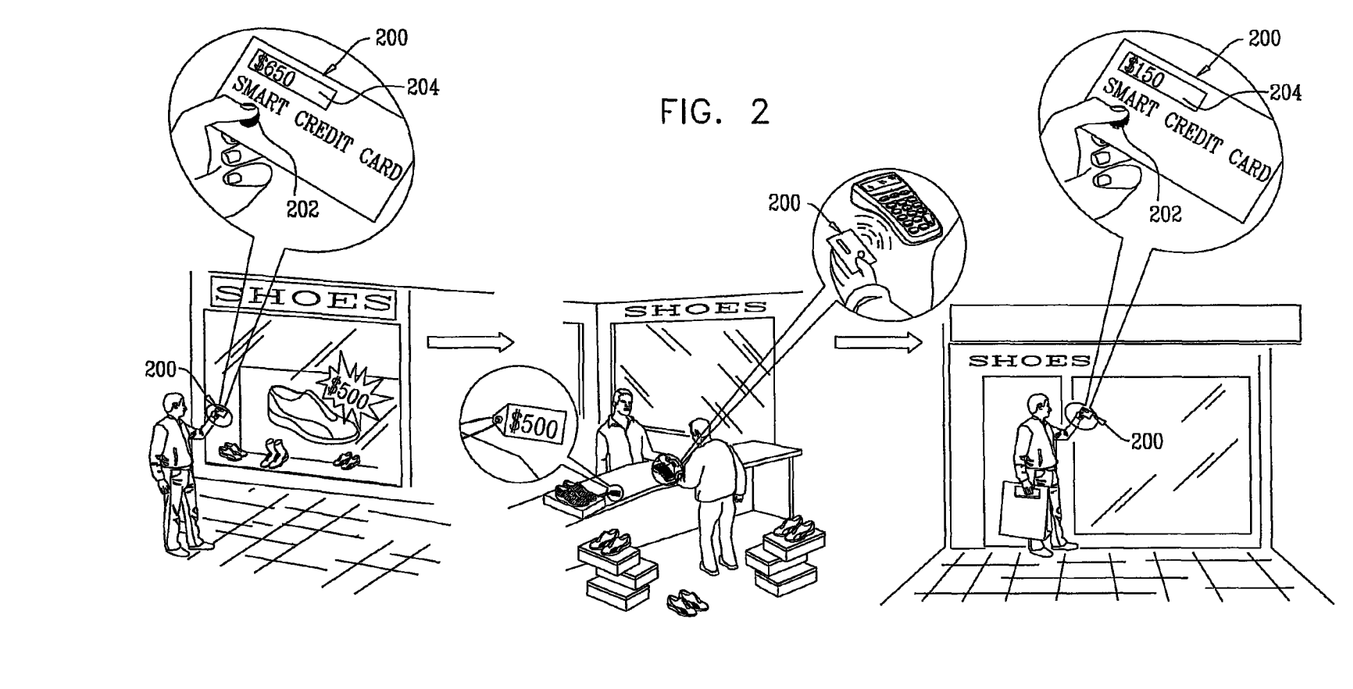
FIG. 2 is a simplified pictorial illustration of a scenario demonstrating typical use of a credit card, constructed and operative in accordance with a preferred embodiment of the present invention.

Reference is now made to FIG. 2, which is a simplified pictorial illustration of a scenario demonstrating typical use of a smart credit card, constructed and operative in accordance with a preferred embodiment of the present invention. The term "smart credit card" as used throughout refers to a credit card including a certified smart card chip and is retrofitted for stand-alone operation. The physical dimensions of the card are preferably in compliance with the above standards.

As seen in FIG. 2, a consumer, considering a possible purchase, queries the amount remaining on his smart credit card 200 typically by pushing a button 202, thereby activating a display 204 which displays remaining authorized credit amount. It is a particular feature of the present invention, that by virtue of the stand-alone operation of the smart credit card, the consumer may obtain an indication of the remaining authorized credit at any location and not only at a point of sale terminal or ATM. It is appreciated that the display may be activated by any other suitable activation activity, such as a user-secure biometric interaction with the user or the entry of a pin code.

The consumer, noting that his remaining authorized credit is sufficient for the contemplated purchase, then proceeds to make a purchase. Following the purchase, the consumer confirms the updated remaining authorized credit card amount by using the smart credit card in a stand-alone mode of operation, thereby reassuring the consumer that the correct amount was charged to his credit card.

It is appreciated that the debit card and credit card described hereinabove with reference to FIGS. 1 and 2 are examples of smart cards constructed and operative in accordance with the present invention. Other examples include electronic identification cards and electronic access control cards.

Figure 3:
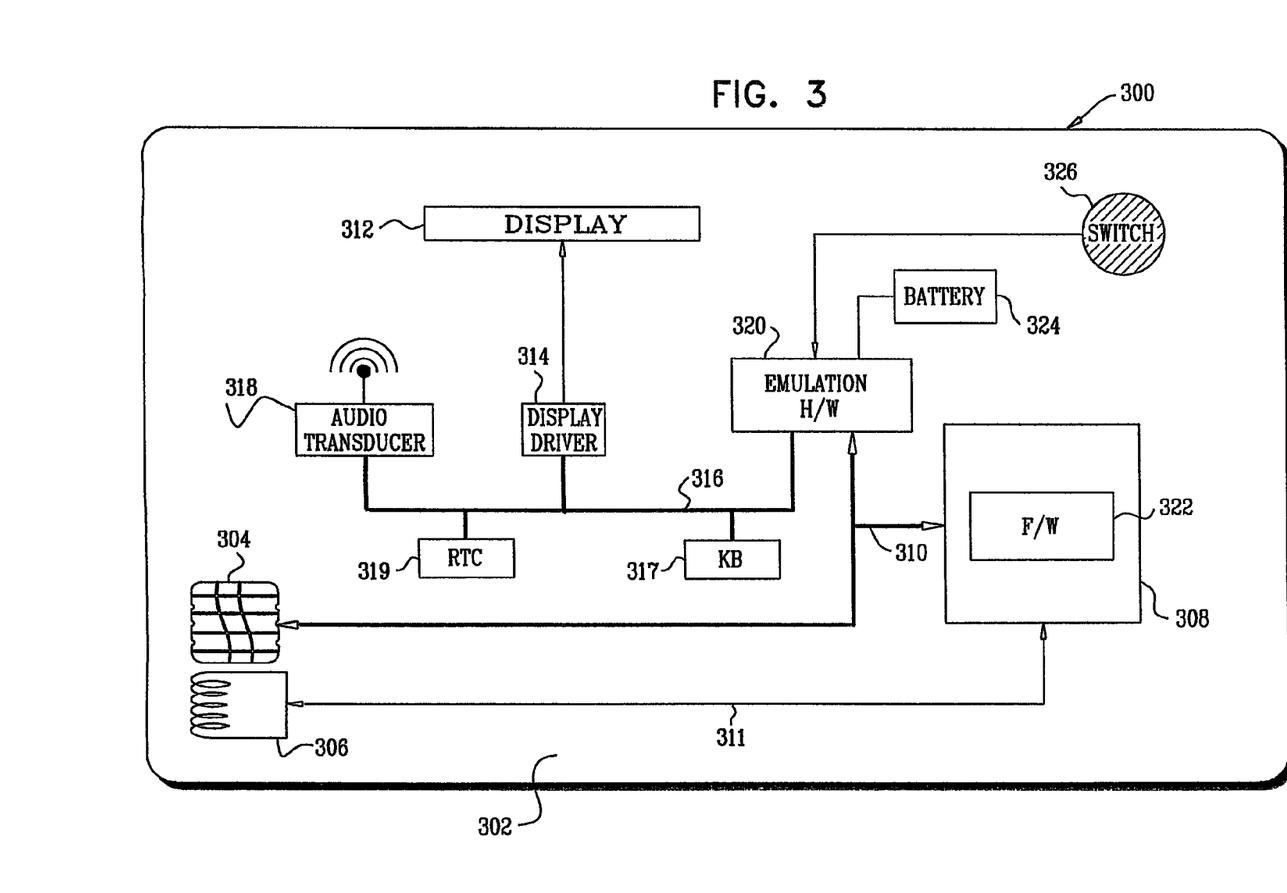
FIG. 3 is a simplified illustration of a smart card constructed and operative in accordance with a preferred embodiment of the present invention including a banking industry certification standards compliant smart card chip retrofitted to work with a display in a stand-alone mode of operation.

Reference is now made to FIG. 3, which is a simplified illustration of a smart card 300 constructed and operative in accordance with a preferred embodiment of the present invention and including a certified smart card chip, retrofitted to work with a display in a stand-alone mode of operation.

The retrofitted conventional smart card of the present invention may be employed as a debit card or credit card as described hereinabove with reference to FIGS. 1 & 2 or as any other suitable secured card which meets the above-referenced certification standards.

As seen in FIG. 3, smart card 300 comprises a conventional smart card substrate 302 on which is mounted at least one and possibly both of a contact interface 304 and a contactless interface 306. A certified smart card chip 308, which includes a secure communications controller, is mounted on substrate 302 and is employed in a retrofitted context wherein it operates in a manner other than its intended manner of use. Certified smart card chips 308 are designed for communication of secure data stored on a smart card exclusively with a certified smart card reader.

The certified smart card chip that is employed in the example described hereinbelow is AT90AZ3636CFT, commercially available from Atmel Corporation 2325 Orchard Parkway San Jose, Calif. USA.

The certified smart card chip 308 preferably contains secure data, such as customer identification and account data, as well as secure access circuitry, preferably embodied in a communications controller and in firmware, designed to permit communication of the secure data, exclusively with a certified smart card reader.

A bus 310 typically interconnects the certified smart card chip 308 with contact interface 304. Contactless interface 306 is typically connected to certified smart card chip 308 via a bi-directional connection 311. In accordance with a preferred embodiment of the invention, a display 312 is mounted on substrate 302 and is typically coupled via a display driver 314 to a bus 316. Optionally a keyboard 317 and/or an audio transducer 318 and/or a real time clock 319 may also be coupled to bus 316.

It is a particular feature of the present invention that retrofit emulation hardware 320 is provided, typically in communication with buses 310 and 316, for enabling retrofitted stand-alone operation of certified smart card chip 308. It is also a particular feature of the present invention that retrofit firmware 322 is provided, also typically in communication with bus 310, for operating certified smart card chip 308 in association with display 312. Retrofit firmware 322 preferably resides on certified smart card chip 308 but alternatively may reside elsewhere on the card 300. A battery 324 is also provided inter alia for powering the display 312, retrofit emulation hardware 320 and certified smart card chip 308. It is appreciated that retrofit emulation hardware 320 may alternatively be embodied in a programmable device.

A manually operable display control switch 326 is preferably provided and preferably directly coupled to retrofit emulation hardware 320.

Figure 4:
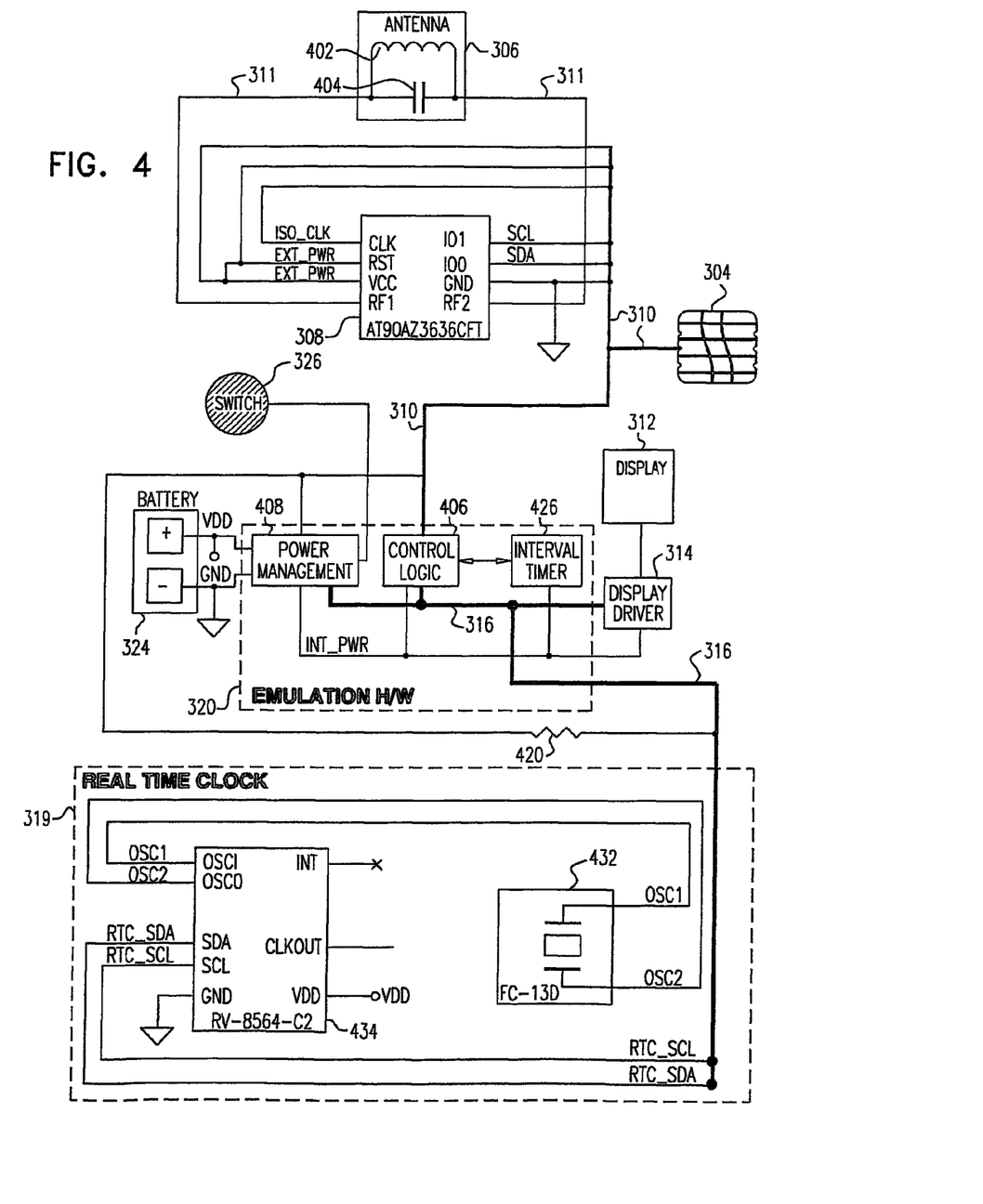
FIG. 4 is a simplified electronic diagram of the smart card of FIG. 3.
Figure 5:
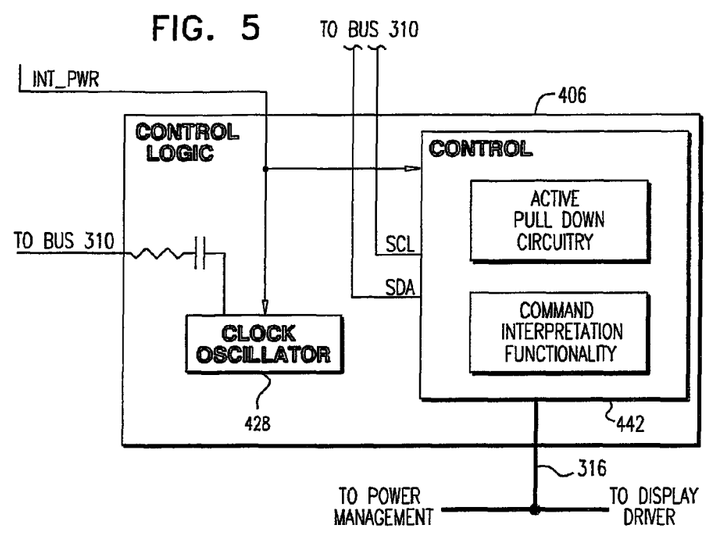
FIG. 5 is a simplified electronic diagram of control logic circuitry forming part of the circuitry of FIG. 4.
Figure 6:
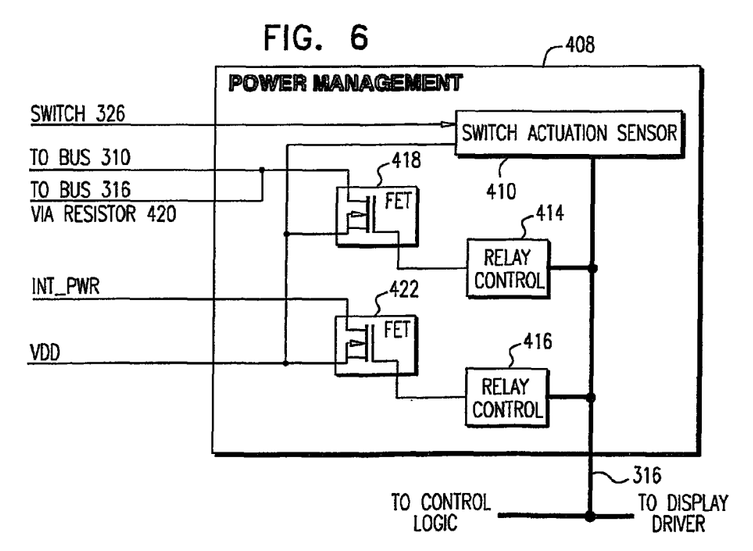
FIG. 6 is a simplified electronic diagram of power management circuitry forming part of the circuitry of FIG. 4.

Reference is now made to FIGS. 4, 5 and 6, which together are a simplified electronic diagram of the smart card of FIG. 3.

As seen in FIG. 4, the following terminals of certified smart card chip 308 are connected to bus 310: VCC and RST, both via an EXT_PWR line; CLK via an ISO_CLK line; GND; IO1 via an SCL line; and IO0 via an SDA line.

Contact interface 304 (FIG. 3) is connected via bus 310 to certified smart card chip 308.

Contactless interface 306 (FIG. 3) is preferably embodied in a parallel connected inductor 402 and capacitor 404, which together define an antenna. The contactless interface 306 preferably is connected between the RF1 and RF2 terminals of the certified smart card chip 308 via bi-directional connection 311 (FIG. 3).

Turning now to the retrofit emulation hardware 320 (FIG. 3), it is seen in FIG. 4 that the retrofit emulation hardware 320 includes control logic circuitry 406 which receives electrical power from power management circuitry 408, which in turn is connected to battery 324 (FIG. 3).

As seen particularly in FIGS. 5 and 6, power management circuitry 408 preferably includes a switch actuation sensor 410 which is coupled to switch 326 (FIG. 3). Switch actuation sensor 410 provides a switch actuation status output via bus 316 (FIG. 3) to first and second relay control circuits 414 and 416, which form part of the power management circuitry 408.

Relay control circuitry 414 turns on a FET 418 when switch 326 is actuated. FET 418 functions as a relay such that when FET 418 is turned on, electrical power from battery 324 is supplied via bus 310 to certified smart card chip 308 at the VCC power terminal and as a logic reference to the RST terminal thereof.

The output of FET 418 is also supplied via a resistor 420, to bus 316 (FIG. 3) to serve as a pull-up logic reference voltage.

Relay control circuitry 416 turns on a FET 422 when switch 326 is actuated. FET 422 functions as a relay such that when FET 422 is turned on, electrical power from battery 324 is supplied via an INT_PWR line to control logic 406, display driver 314 (FIG. 3), and to an interval timer 426, which forms part of the retrofit emulation hardware 320.

Battery power is directly supplied irrespective of the actuation state of switch 326 to optional real time clock circuitry 319 (FIG. 3). Real time clock circuitry 319 preferably includes a crystal oscillator 432 which provides an output to a real time clock chip 434, preferably an RV-8564-C2, commercially available from Micro Crystal AG Mählestrasse 14 CH-2540 Grenchen, Switzerland. The output of real time clock chip 434 may be supplied to certified smart card chip 308 at the IO0 and IO1 terminals thereof via bus 316, control logic 406 and bus 310. Real time clock circuitry 319 is useful for real time security code generation. Such real time generated security codes may be displayed to a user on display 312 and employed for transaction authentication.

IO0 and IO1 terminals of certified smart card chip 308 are connected via respective SDA and SCL lines to corresponding terminals of control circuitry 442, which forms part of control logic circuitry 406.

Control circuitry 442 includes command interpretation functionality which directs outputs received along the SDA and SCL lines from certified smart card chip 308 to one or more of the following elements of the retrofit emulation hardware 320 and of the display driver 314: relay control circuitry 414 via bus 316, relay control circuitry 416 via bus 316 and interval timer 426.

Control circuitry 442 also includes active pull-down circuitry, which couples the SDA line and thus the IO0 terminal of certified smart card chip 308 via a resistance to ground when control circuitry 442 is powered.

Figure 7:
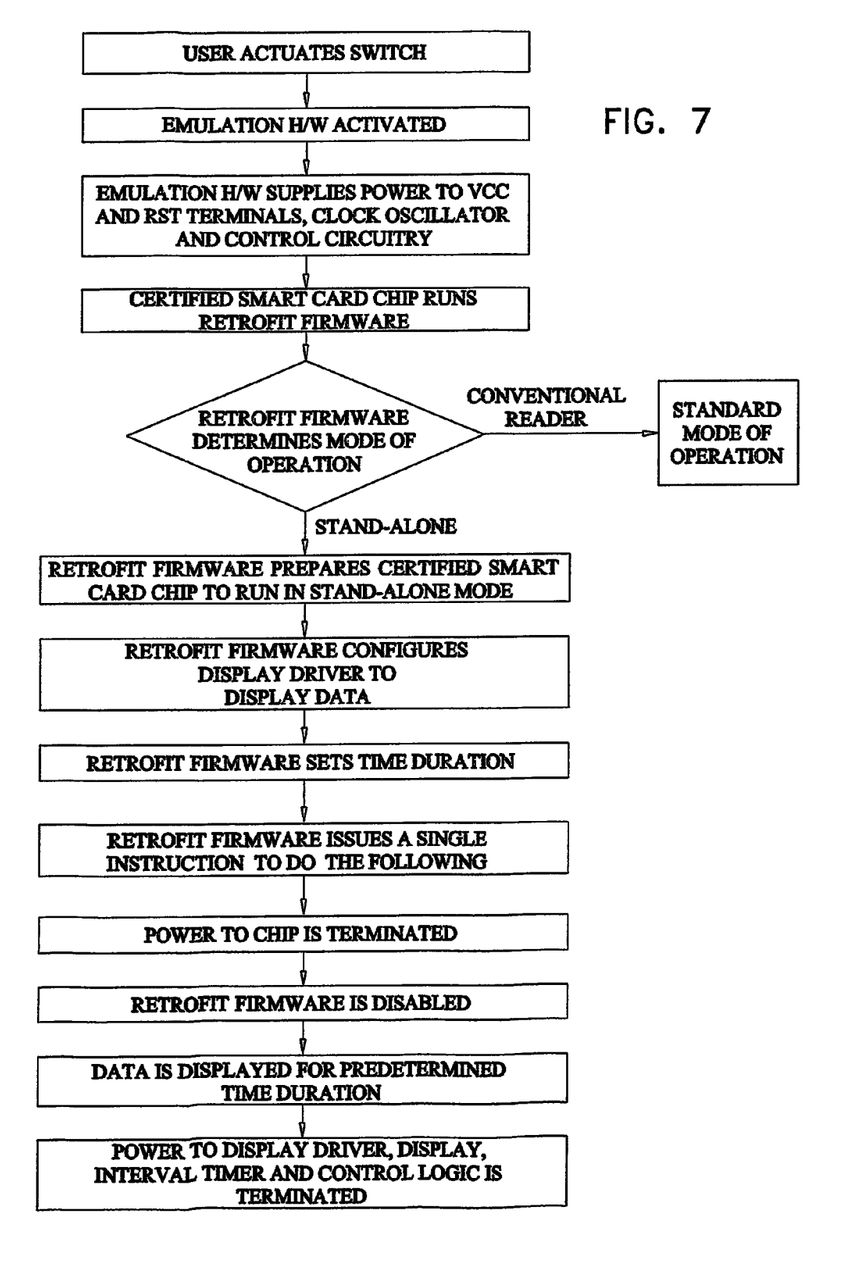
FIG. 7 is a simplified general flow diagram illustrating retrofit-enabled operation of a preferred embodiment of the present invention.

Reference is now made to FIG. 7, which is a simplified general flow diagram illustrating retrofit-enabled operation of a preferred embodiment of the present invention in a stand-alone mode of operation.

Referring to the example illustrated in FIGS. 4, 5 and 6, when the user actuates switch 326, this provides a switch actuation signal, which is sensed by a switch actuation sensor 410, forming part of the retrofit emulation hardware 320. An output of switch actuation sensor 410 causes relay control circuitry 414 in the retrofit emulation hardware 320 to supply a voltage from battery 324 simultaneously to the VCC and RST terminals of certified smart card chip 308.

The output of switch actuation sensor 410 also causes relay control circuitry 416 in the retrofit emulation hardware 320 to supply a voltage from battery 324 to simultaneously actuate clock oscillator 428 and control circuitry 442 in the retrofit emulation hardware 320. Clock oscillator 428 begins to provide a clock signal to the clock terminal CLK of the certified smart card chip 308.

If certified smart card chips 308 other than the AT90AZ3636CFT chip are employed, specific timing requirements for supply of voltages to the power, reset and clock terminals of such chips may be required to be met by retrofit emulation hardware 320.

It is appreciated that switch 326 may be embodied in a push button as illustrated in FIGS. 1 and 2 or alternatively may be any other suitable type of switch such as an optical, touch, audio or other switch or a combination thereof.

The provision of voltages to the power VCC, reset RST and clock CLK terminals of the certified smart card chip 308 enables certified smart card chip 308 to run retrofit firmware installed thereon including the retrofit firmware 322. The retrofit firmware 322 includes mode of operation identification functionality, which enables the certified smart card chip 308 to distinguish between operation in communication with a conventional contact or contactless smart card reader and stand-alone operation in accordance with the present invention.

The foregoing functions are functions which were not originally enabled by the certified smart card chip 308 but are enabled by the retrofit provided in accordance with the present invention. More specifically, the retrofitted functionality enables the certified smart card chip 308 to operate in a stand-alone mode of operation employing the same data terminal, IO0, which is used for non-stand-alone operation.

Preferably the mode of operation identification functionality senses whether the serial data terminal IO0 of the certified smart card chip 308 is in a positive or zero logic state. A positive logic state indicates that a conventional contact smart card reader is galvanically connected to the certified smart card chip 308 via contact interface 304. A zero logic state indicates that the certified smart card chip is connected for operation in a stand-alone mode. The retrofit emulation hardware 320 provides a zero logic state connection to the data terminal IO0 in the absence of an external reader by means of active pull-down circuitry located in control circuitry 442.

In the presence of an external reader, the certified smart card chip 308 may communicate with the external reader via contact interface 304 as if the retrofit firmware and hardware was not present. If a contactless reader is employed, the communication may be via contactless interface 306. In either case, switch 326 is not actuated and thus control circuitry 442 is not powered with the result that the active pull-down circuitry is not operative. It is noted that the example described herein with reference to FIGS. 3-6 refers to communication via contact interface 304, it being appreciated that functionality based on communication via contactless interface 306 may be alternatively provided.

It is appreciated that the present invention provides a retrofitted smart card including a certified smart card chip including secure access circuitry permitting communication exclusively with a certified smart card chip reader, a display and retrofitted circuitry operative to enable said certified smart card chip to communicate data to said display and also to communicate with said certified smart card chip reader.

Once the mode of operation identification functionality indicates operation of the certified smart card chip in a stand-alone mode of operation, the following takes place:

A. optionally the retrofit firmware 322 decouples the serial data terminal IO0 from the communications controller which is built into the certified smart card chip 308;

alternatively, the retrofit firmware 322 employs the communications controller which is built into the certified smart card chip 308;

whether or not the retrofit firmware 322 decouples the serial data terminal IO0 from the communications controller which is built into the certified smart card chip 308, the retrofit firmware 322 controls communications to and from the certified smart card chip 308 via data terminal IO0

B. optionally, the retrofit firmware employs the clock signals received from clock oscillator 428;

alternatively, the retrofit firmware employs clock signals received from a clock oscillator built into the certified smart card chip 308;

C. the retrofit firmware 322 operates the certified smart card chip 308 for processing and displaying secure data on the display 312.

In the example of a debit card described hereinabove with reference to FIG. 1, the retrofit firmware 322 retrieves the current debit card balance from an internal non-volatile memory of the certified smart card chip 308 and outputs it via data terminal IO0, bus 310 and bus 316 to display driver 314.

In the example of a credit card described hereinabove with reference to FIG. 2, the retrofit firmware 322 retrieves the remaining available credit amount from an internal non-volatile memory of the certified smart card chip 308 and outputs it to display driver 314.

D. the retrofit firmware configures the display driver to display the secure data;

E. the retrofit firmware sets a predetermined time duration on the interval timer 426;

F. the retrofit firmware 322 issues a single instruction which results in the sequence indicated below:

the retrofit emulation hardware 320 terminates the supply of electrical power to the certified smart card chip 308, thus disabling the retrofit firmware 322; and preferably once the supply of electrical power to the certified smart card chip 308 has been terminated and the retrofit firmware has been disabled, the display driver 314 causes the display 312 to display the secure data for the predetermined time duration set on interval timer 426;

at the end of the predetermined time duration, the supply of electrical power to the display driver 314, the display 312, the interval timer 426 and the control logic circuitry 406 is terminated.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A retrofitted smart card comprising:
   a certified smart card chip;
   a display;
   retrofitted emulation circuitry operative to enable said certified smart card chip to communicate information to said display notwithstanding that said certified smart card chip is configured for communication only with an external read/write device; and
   retrofit firmware for operating said certified smart card chip at least in the absence of an external read/write device; and
   a display control switch;
   wherein, upon actuation of the display control switch, voltage is supplied to the certified smart card chip thereby enabling the certified smart card chip to run the retrofit firmware, wherein the retrofit firmware can distinguish between operation in communication with the external read/write device and operation in a stand alone mode;
   wherein when the retrofit firmware detects operation in the stand-alone mode;
   I) the retrofit firmware controls communications to and from said certified smart card chip;
   II) the retrofit firmware employs clock signals received from a clock oscillator;
   III) the retrofit firmware operates the certified smart card chip for processing and displaying secure data on the display;
   IV) the retrofit firmware configures a display driver to display said secure data;
   V) the retrofit firmware sets a predetermined time duration on an interval timer; or
   VI) the retrofit firmware issues a single instruction which results in the sequence indicated below:
   a) a supply of electrical power to the certified smart card chip is terminated, thus disabling the retrofit firmware; and
   b) once the supply of electrical power to said certified smart card chip has been terminated and the retrofit firmware has been disabled, the display driver causes the display to display the secure data for a predetermined time duration; and
   c) at the end of the predetermined time duration, the supply of electrical power to said display is terminated.

2. A retrofitted card according to claim 1 and also comprising a substrate supporting said certified smart card chip, said display and said retrofitted circuitry, said substrate having a thickness which does not exceed 0.8 mm.

3. A retrofitted card according to claim 2 and also comprising at least one of:
   a contact interface and a bus interconnecting said certified smart card chip with said contact interface; and
   a contactless interface mounted on said substrate and a bidirectional connection interconnecting said certified smart card chip with said contactless interface.

4. A retrofitted card according to claim 1 and also comprising:
   an electrical power element operative for powering said certified smart card chip, said retrofitted circuitry and said display; and
   power management circuitry operative to provide electrical power to said certified smart card chip and to said display generally at non-overlapping times.

5. A retrofitted card according to claim 1 and wherein said retrofitted circuitry includes hardware external to said certified smart card chip.

6. A retrofitted card according to claim 1 and wherein said certified smart card chip is a smart card chip which is operable to communicate data only with an external read/write device and with said display.

7. A retrofitted card according to claim 1 and wherein said certified smart card chip is employed in a retrofitted context to operate in a manner other than its intended manner of use.

8. A retrofitted card according to claim 1 and also comprising:
   power management circuitry including a switch actuation sensor which is coupled to said display control switch; and
   said switch actuation sensor providing a switch actuation output to first and second relay control circuits.

9. A retrofitted card according to claim 8 and wherein said retrofitted circuitry comprises control logic circuitry which receives electrical power from said power management circuitry.

10. A retrofitted card according to claim 9 and wherein said second relay control circuit is operative in response to said switch actuation output to provide electrical power to said control logic circuitry, to a display driver and to an interval timer.

11. A retrofitted card according to claim 8 and wherein said first relay control circuit is operative in response to said switch actuation output to provide electrical power to said certified smart card chip.

12. A retrofitted card according to claim 1 and also comprising real time clock circuitry providing real time security code generation.

13. The retrofitted smart card of claim 1, wherein when the retrofit firmware detects operation in the stand-alone mode
   the retrofit firmware controls communications to and from said certified smart card chip.

14. A method of providing a smart card with a card-mounted display function comprising:
   providing a certified smart card chip;
   associating a display with said certified smart card chip;
   emulating an external read/write device to enable said certified smart card chip to communicate with said display notwithstanding that said certified smart card chip had originally been configured for secure communication only with an external read/write device;
   running retrofit firmware residing on said certified smart card chip for operating said certified smart card chip at least in the absence of an external read/write device;
   providing a switch actuation signal when a user actuates a display control switch; and
   responsive to said switch actuation signal, supplying a voltage to said certified smart card chip and simultaneously actuating a clock oscillator which begins to provide a clock signal to a clock terminal of said certified smart card chip.

15. A method for providing a smart card with a card-mounted display function according to claim 14 and wherein said:
   certified smart card chip includes secure access circuitry permitting communication exclusively with a certified smart card chip reader; and
   said method also comprises causing said certified smart card chip to communicate data to said display and also to communicate with said certified smart card chip reader.

16. A method for providing a card-mounted display function according to claim 14 and wherein said supplying a voltage to said certified smart card chip enables said certified smart card chip to run retrofit firmware installed thereon including mode of operation identification functionality, which enables said certified smart card chip to distinguish between operation in communication with a conventional contact or contactless smart card reader and stand-alone operation.

17. A method for providing a card-mounted display function according to claim 16 and wherein:
   said stand-alone mode of operation employs at least some of the same data terminals which are used for non-stand-alone operation; and
   said mode of operation identification functionality senses whether the serial data terminal of said certified smart card chip is in a positive or zero logic state, wherein a positive logic state indicates that a conventional contact smart card reader is galvanically connected to said certified smart card chip and zero logic state indicates that said certified smart card chip is connected for operation in a stand-alone mode.

18. A method for providing a card-mounted display function according to claim 17 and wherein when said certified smart card chip operates in a stand-alone mode of operation, at least one of the following steps occurs:
   I. said retrofit firmware controls communications to and from said certified smart card chip;
   II. said retrofit firmware employs the clock signals received from a clock oscillator;
   III. said retrofit firmware operates said certified smart card chip for processing and displaying secure data on said display;
   IV. said retrofit firmware configures a display driver to display said secure data;
   V. said retrofit firmware sets a predetermined time duration on an interval timer; or
   VI. the retrofit firmware issues a single instruction which results in the sequence indicated below:
   the supply of electrical power to said certified smart card chip is terminated, thus disabling the retrofit firmware; and
   once the supply of electrical power to said certified smart card chip has been terminated and the retrofit firmware has been disabled, said display driver causes said display to display the secure data for a predetermined time duration; and
   at the end of the predetermined time duration, the supply of electrical power to said display is terminated.

19. A retrofitted smart card comprising:
   a certified smart card chip;
   a display;
   retrofitted emulation circuitry operative to enable said certified smart card chip to communicate information to said display notwithstanding that said certified smart card chip is configured for communication only with an external read/write device; and
   retrofit firmware for operating said certified smart card chip at least in the absence of an external read/write device;
   a display control switch; power management circuitry including a switch actuation sensor which is coupled to said display control switch, said switch actuation sensor providing a switch actuation output to first and second relay control circuits;
   wherein, upon actuation of the display control switch, voltage is supplied to the certified smart card chip thereby enabling the certified smart card chip to run the retrofit firmware, wherein the retrofit firmware can distinguish between operation in communication with the external read/write device and operation in a stand alone mode;
   wherein said retrofitted circuitry comprises control logic circuitry which receives electrical power from said power management circuitry; and
   wherein said second relay control circuit is operative in response to said switch actuation output to provide electrical power to said control logic circuitry, to a display driver and to an interval timer.

* * * * *